(12) United States Patent
Kar

(10) Patent No.: US 10,495,468 B2
(45) Date of Patent: Dec. 3, 2019

(54) NAVIGATION USING SHORT-RANGE TRANSMISSIONS

(71) Applicant: Uber Technologies, Inc., San Francisco, CA (US)

(72) Inventor: Siddharth Kar, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 222 days.

(21) Appl. No.: 15/798,007

(22) Filed: Oct. 30, 2017

(65) Prior Publication Data

US 2019/0128675 A1 May 2, 2019

(51) Int. Cl.
*G01C 21/20* (2006.01)
*H04W 4/02* (2018.01)
*H04W 4/80* (2018.01)
*H04W 4/021* (2018.01)
*H04W 4/06* (2009.01)
*H04W 4/40* (2018.01)

(52) U.S. Cl.
CPC ............ *G01C 21/206* (2013.01); *H04W 4/02* (2013.01); *H04W 4/021* (2013.01); *H04W 4/027* (2013.01); *H04W 4/06* (2013.01); *H04W 4/40* (2018.02); *H04W 4/80* (2018.02)

(58) Field of Classification Search
CPC .......... G01S 1/00; G01C 21/206; H04W 4/02; H04W 4/021; H04W 4/80; H04W 4/043
USPC .......................................... 701/428; 342/451
See application file for complete search history.

(56) References Cited

U.S. PATENT DOCUMENTS

| 9,204,257 | B1 | 12/2015 | Mendelson |
| 9,706,367 | B2 | 7/2017 | Tao et al. |
| 2013/0285855 | A1* | 10/2013 | Dupray .................. G01S 19/48 342/451 |
| 2014/0114564 | A1 | 4/2014 | Callaghan et al. |

(Continued)

FOREIGN PATENT DOCUMENTS

KR 10-2017-0088686 A 8/2017

OTHER PUBLICATIONS

PCT International Search Report and Written Opinion, PCT Application No. PCT/IB2018/058033, dated Feb. 8, 2019, 11 pages.

*Primary Examiner* — Isaac G Smith
(74) *Attorney, Agent, or Firm* — Fenwick & West LLP

(57) ABSTRACT

A network system uses Wi-Fi signals or other types of short-range transmissions to determine navigation to pickup locations for users receiving services provided via the network system. In an embodiment, the network system builds a database of reference signatures of short-range transmissions previously detected by client devices of users at a geographical region, where the reference signatures are mapped to corresponding locations of the geographical region. By comparing a signature detected by a particular user's client device to the reference signatures, the network system may check for similarities between the short-range transmissions. Responsive to finding a match, the network system determines a current location of the particular user at the geographical region. Accordingly, by leveraging the database, the network system may determine a route for travel by the particular user from the current location to a pickup location without having to use GPS signals.

20 Claims, 6 Drawing Sheets

(56) References Cited

U.S. PATENT DOCUMENTS

2017/0164155 A1 6/2017 Venkatraman et al.
2017/0171719 A1* 6/2017 Igarashi ............... H04W 4/043

* cited by examiner

NAVIGATION USING SHORT-RANGE TRANSMISSIONS

BACKGROUND

1. Field

This disclosure generally relates to providing navigation to geographic locations for a network system, and more specifically to using signatures of short-range transmissions for navigating to pickup locations for services provided via the network system.

2. Description of the Related Art

In a network system, providers provide geographic location-based services to users, for example, a provider uses a vehicle to transport a user. Users can manually search for a pickup location, that is, the location at which they want the provider to pick them up to start a trip. However, searching for pickup locations may be difficult when users are located somewhere that does not have reception of global positioning system (GPS) signals, such as inside a building that may block out GPS signals. Further, in situations where a user is located at a large venue or building such as a shopping mall with multiple possible pickup locations within vicinity of each other, a conventional system may not reliably resolve the user's desired pickup location. For example, there are exits on both a north and south side of the shopping mall, but the system does not receive GPS signal data with enough granularity to determine which of the two locations is the user's desired pickup location. Moreover, the user may not know directions to the pickup location, or for instance, the user arrives at the north exit of the mall believing that it is actually the south exit, causing a delay in pickup by the provider. Providing inaccurate pickup locations, or inaccurate navigation to pickup locations, results in a poor user experience, which may cause users to stop using services of the system.

SUMMARY

A network system uses Wi-Fi signals or other types of short-range transmissions to determine navigation to pickup locations for users receiving services provided via the network system. For example, a particular user inside a building requests transportation service and wants a provider to pick up the particular user for the transportation service at a certain exit of the building. Thus, even if the particular user's client device does not have reliable GPS signal reception (e.g., inside the building or underground), the network system can still determine where the particular user is located and a route from the particular user's current location to a pickup location.

The network system includes a database of reference signatures of short-range transmission previously detected by other client devices of users when the other client devices were located at various locations within or nearby a geographical region such as the building. In some embodiments, the networks system maps the reference signatures to the corresponding locations of the geographical region. Accordingly, by leveraging the database, the network system may determine a current location of the particular user by checking for similarities between signatures detected by the client device of the particular user and the reference signatures. In addition, the network system may determine a route from the current location to the pickup location using the signatures and without necessarily using other sensor data such as GPS signals.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
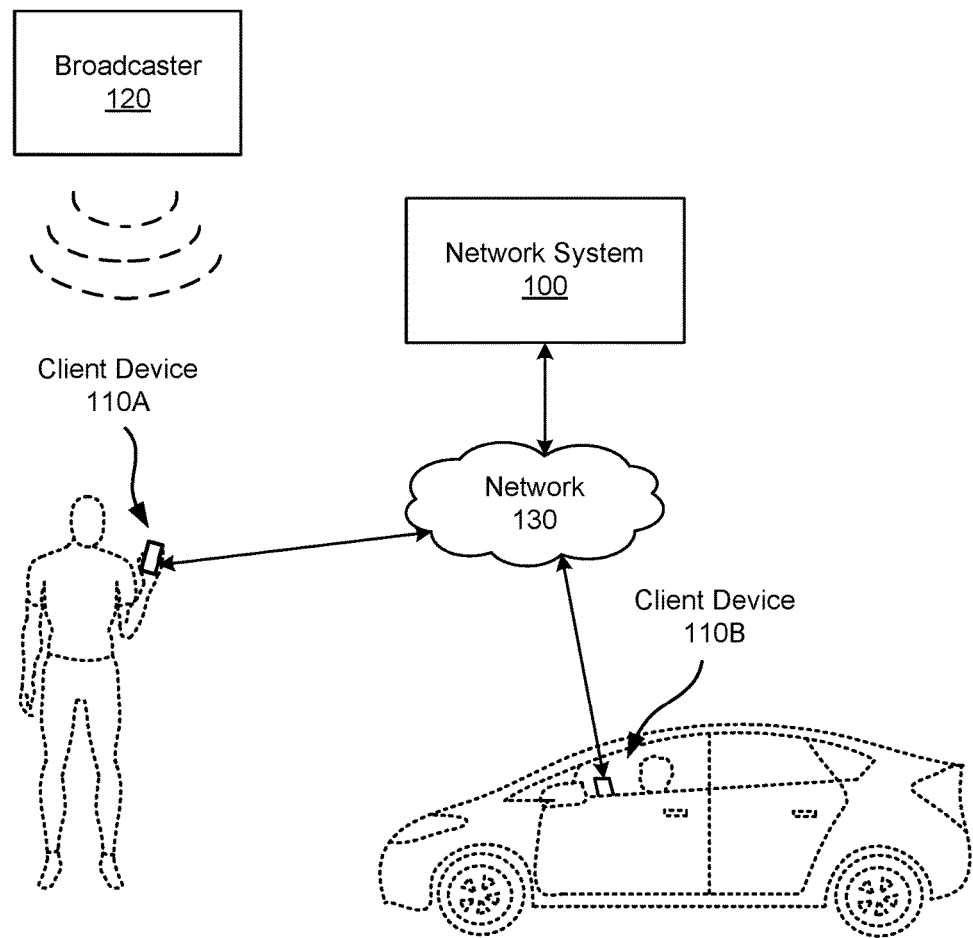
FIG. 1 is a diagram of a system environment for a network system according to one embodiment.

FIG. 1 is a diagram of a system environment for a network system 100 according to one embodiment. Users of the network system 100 may include providers that provide service to other users. In an example use case, a provider operates a vehicle to transport a user from a first location, referred to herein as a "pickup location," to a second location, referred to herein as a "destination location." The network system 100 may determine pickup locations and coordinate providers to pick up users at the pickup locations. In some use cases, there may be multiple pickup locations nearby a geographical region (e.g., within a threshold radius or a predetermined boundary). For instance, a user may be picked up one of multiple exits of a building (e.g., on the north, east, south, or west side), which may also be located at different floors of the building. The network system 100 may provide navigation for the user to travel from a current location in the building to a pickup location at a particular exit. Other types of services provided via the network system 100 include, for example, delivery of goods such as mail, packages, or consumable items.

The system environment includes the network system 100 and one or more client devices 110 of users of the network system 100, for example, client device 110A of a user and client device 110B of a provider providing service to the user, which may collectively be referred to herein as a "client device 110" or "client devices 110." The network system 100 and client devices 110 are connected to each other via a network 130. Additionally, the system environment includes one or more broadcasters 120 that transmit short-range transmissions such as Wi-Fi, BLUETOOTH®, or infrared (IR) signals. A broadcaster 120 may be a Wi-Fi router, a BLUETOOTH® beacon, an infrared beacon, or any other suitable device that transmits short-range transmissions. In some embodiments, a broadcaster 120 is optionally connected to one or more of the other components shown in FIG. 1 via the network 130. In other embodiments, different or additional entities can be included in the system environment. The functions performed by the various entities of FIG. 1 may vary in different embodiments.

A user can interact with the network system 100 through the client device 110, e.g., to request service or to receive requests to provide service. A client device 110 can be a personal or mobile computing device, such as a smartphone, a tablet, or a notebook computer. In some embodiments, the client device 110 executes a client application that uses an application programming interface (API) to communicate with the network system 100 through the network 130. The client application of the client device 110 can present information received from the network system 100 on a user interface, such as a geographic map (e.g., within a building or outdoors), current location of the client device 110, or route to a pickup location. In some embodiments, the client application running on the client device 110 can determine the current location using one or more sensors of the client device 110, such as a global positioning system (GPS) receiver, and provide the current location to the network system 100.

In addition, or alternatively, to a GPS receiver, the client device 110 may include other sensors such as a Wi-Fi radio (or receiver), a BLUETOOTH® radio, a camera (e.g., capable of detecting IR signals), or a motion sensor. The Wi-Fi and BLUETOOTH® radios detect short-range transmissions such as Wi-Fi and BLUETOOTH® signals, respectively. Motion sensors include, e.g., accelerometers, gyroscopes, magnetic sensors, inertial measurement units (IMUs), and the like. The motion sensors can capture telematics data describing motion or bearing of the user or a vehicle in which the user traveling. The client device 110 can provide detected signatures of the short-range transmissions along with the telematics data to the network system 100 for further processing.

In one embodiment, through operation of the client device 110, a user makes a trip request to the network system 100. The trip request provided by the client application to the network system 100 includes, for example, user identification information, the number of passengers for the trip, a requested type of the service provider (e.g., a vehicle type or service option identifier), a signature of short-range transmission detected by the client device 110, telematics data, a current location of the client device 110, or a pickup location or destination location for the trip. The user may input data for the trip request via a user interface of the client device 110. For example, the user inputs text describing the pickup or destination location for a trip using a touchscreen keyboard of the client device 110.

In some embodiments, a provider uses a client device 110 to interact with the network system 100 and receive invitations to provide service for users. For example, the provider is a person operating a vehicle capable of transporting users. In some embodiments, the provider is an autonomous vehicle that receives routing instructions from the network system 100. For convenience, this disclosure generally uses a car as the vehicle, which is operated by a driver as an example provider. However, the embodiments described herein may be adapted for a provider operating alternative vehicles (e.g., boat, airplane, helicopter, VTOL, etc.) or vehicles that do not necessarily need to be operated by a person.

In some embodiments, a provider can receive invitations or assignment requests through a client device 110. An assignment request identifies a user who submitted a trip request to the network system 100 and determines the pickup location or the destination location of the user for a trip. For example, the network system 100 can receive a trip request from a client device 110 of a user, select a service provider from a pool of available (or "open") providers to provide the trip, e.g., based on the vehicle type, determined pickup location, a signature of short-range transmission, or the destination location. The network system 100 transmits an assignment request to the selected provider's client device 110.

Client devices 110 can communicate with the network system 100 via the network 130, which may comprise any combination of local area and wide area networks employing wired or wireless communication links. In one embodiment, the network 130 uses standard communications technologies and Internet protocols. For example, the network 130 includes communication links using technologies such as the Internet, 3G, 4G, BLUETOOTH®, or Wi-Fi. In some embodiments, all or some of the communication links of the network 130 may be encrypted.

II. Example System Architecture

Figure 2:
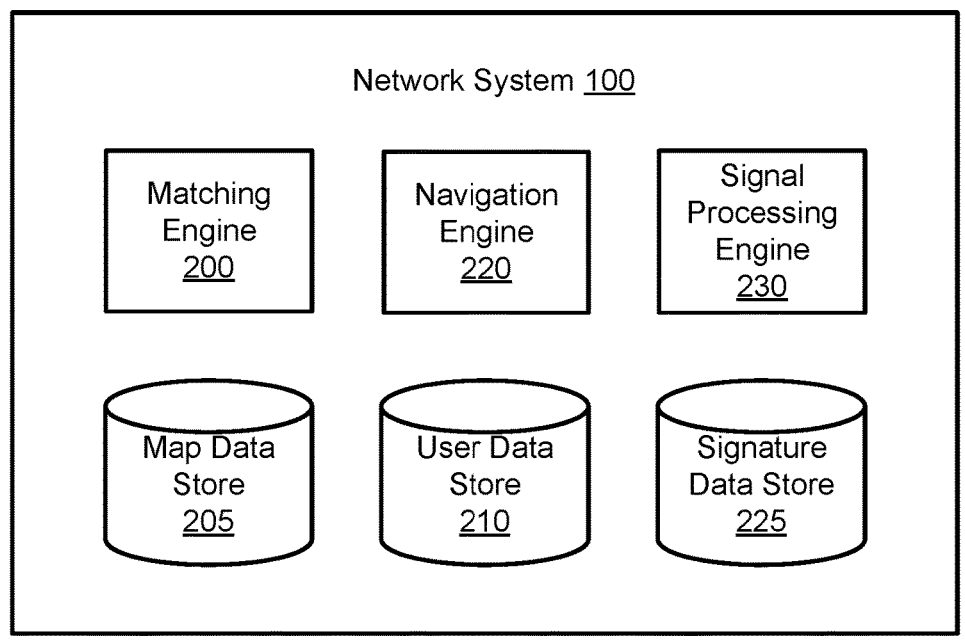
FIG. 2 is a block diagram illustrating the architecture of the network system according to one embodiment.

FIG. 2 is a block diagram illustrating the architecture of a network system 100 according to one embodiment. The network system 100 includes a matching engine 200, map data store 205, user data store 210, navigation engine 220, signature data store 225, and signal processing engine 230. In other embodiments, the network system 100 may include additional, fewer, or different components for various applications.

In some embodiments, users and providers use their client devices 110 to register with the network system 100, for example, by creating accounts and providing user information (e.g., contact information, or a home or office address) to the network system 100. The network system 100 stores the user information in the user data store 210. The network system 100 can associate feedback received from a user or data from trips (e.g., pickup or destination locations, signatures of short-range transmission detected by a client device 110 as a user navigates to a pickup location, or other sensor data) taken by the user with the registered account of the user.

The map data store 205 stores map information of geographic regions in which the network system 100 offers services such as transportation for users. The map information may include map properties of a geographical region such as road properties that describe characteristics of the road segments, such as speed limits, road directionality (e.g., one-way or two-way), traffic history, traffic conditions, addresses on the road segment, length of the road segment, and type of the road segment (e.g., surface street, residential, highway, toll). Moreover, the map information may include map properties of venues and buildings such as floor plans (or layout) of a shopping mall, airport, business complex, fairgrounds, etc. The floor plans may indicate the location of stairs, escalators, or elevators, bathrooms, exits/entrances, points of interest, commercial or residential addresses and related information (e.g., name, type, multimedia, or hours of operation of a shopping mall), loading zones at a curb, and the like. The network system 100 may use the map data store 205 to determine navigation information, pickup locations, or destination locations for users.

The matching engine 200 coordinates services provided by the providers to users. In particular, the matching engine 200 selects providers to service the requests of users. For example, the matching engine 200 receives a trip request from a user and determines a set of candidate providers that are online, open (e.g., are available to transport a user), and near the requested pickup location for the user. The matching engine 200 selects a provider from the set of candidate providers to which it transmits an assignment request. Specifically, the matching engine 200 may select a provider based on, e.g., a signature of short-range transmission, the provider's location, the pickup or destination location, the type of the provider, the amount of time the provider has been waiting for an assignment request, among other factors.

The navigation engine 220 provides navigation information for users to travel to pickup locations, in response to receiving requests for service from the users. A client device 110 of a user may present the navigation information as routing instructions using graphical elements (e.g., an arrow or highlighted path on a map), text (e.g., "walk toward the elevators," "take the stairs to the ground floor," or "head toward the lobby"), audio instructions, any combination thereof, or other suitable methods to convey the routing instructions. Additionally, the client device 110 may detect one or more signatures of short-range transmission as the user navigates from a current location to a pickup location. The client device 110 provides the detected signatures of short-range transmission to the network system 100, which stores the detected signatures as reference signatures in the signature data store 225. In particular, the navigation engine 220 may associate a reference signature with a corresponding location of a floor plan of a building (e.g., from the map data store 205). For instance, a reference signature is detected by a client device 110 when the user navigated to (and was located at) the elevators of the building. Thus, the navigation engine 220 may map the reference signature to the given location of the elevators, e.g., by tagging the reference signature with the given location or storing the data in a look-up table (LUT).

In some embodiments, the network system 100 tasks a user or provider (not necessarily requesting a service) to navigate around a geographical region, such as a building or venue, to collect reference signatures detected by a client device 110 at various locations within or nearby the geographical region. In contrast to passively detecting signatures by client devices 110 of users requesting services (as described above), tasking users or providers is a more active method for the network system 100 to generate or update a map of reference signatures for the geographical region. The navigation engine 220 may aggregate reference signatures received from both the passive and active methods in the signature data store 225. Further, the navigation engine 220 may periodically update reference signatures in the signature data store 225 to account for changes of a geographical region over time, e.g., previous broadcasters 120 are removed or re-located, new broadcasters 120 are added, or a portion of a building undergoes construction/remodeling.

The navigation engine 220 determines navigation information by analyzing signatures short-range transmission using the signal processing engine 230. In particular, responsive to the network system 100 receiving a request for service from a client device 110 of a given user, the signal processing engine 230 receives a signature detected by the client device 110. The signal processing engine 230 checks for similarities between the signature and reference signatures of the signature data store 225. Responsive to determining that a level of similarity between the signature and a given reference signature is greater than a threshold value, the signal processing engine 230 identifies a location associated with the given reference signature in the signature data store 235. The navigation engine 220 determines that the identified location is the current location of the client device 110. Using map information from the map data store 205, the navigation engine 220 determines a route for travel for the user from the current location to the pickup location. Further, the navigation engine 220 may store the route for travel, or an actual route traveled by the client device 110 (e.g., if the user took a detour or otherwise deviated from the route) in the user data store 210.

In an embodiment, the navigation engine 220 determines "hotspot locations" that were previously selected a threshold number of times for services provided via the network system 100 (e.g., popular pickup locations selected by other users). For example, the hotspot locations (e.g., stored in the map data store 205) are located at or nearby transit stations, entrances/exits of buildings, or other points-of-interest such as tourist attractions or public spaces. The navigation engine 220 may determine to use one of the hotspot locations as the pickup location and determine the route for travel by the user based on the hotspot location. For instance, the navigation engine 220 receives a point address input by the user using the client device 110. The navigation engine 220 performs lookups from the map data store 205 to identify a hotspot that is located within a threshold distance from the point address. Thus, the navigation engine 220 may predict that the user intended to select the identified hotspot location, but inputted the point address instead as an approximate location, e.g., because the user did not know the exact address of the hotspot location. In some embodiments, the navigation engine 220 may retrieve, from the user data store 210, previous routes provided to other users or traveled by other users to hotspot locations (e.g., used as pickup locations) for services provided via the network system 100. The navigation engine 220 may determine a route for travel by the user to the hotspot location based on the previous routes. For instance, by aggregating the previously traveled routes, the navigation engine 220 may optimize for duration of travel time when determining the route from a current location of the user to the hotspot location, e.g., determining to travel through one section of a mall that is less crowded on average than another section of the mall.

In some embodiments, the signal processing engine 230 processes telematics data captured by sensors of client devices 110 to determine commute information describing navigation of client devices 110 to pickup locations. For example, the telematics data indicates a speed at which the client device 110 is moving. Thus, the signal processing engine 230 can determine whether a user of the client device 110 is walking or on a vehicle, e.g., moving faster on average than an estimated walking speed. The signal processing engine 230 may store the commute information, telematics data, and/or associated information (e.g., which may be mapped to a request for service) in the signature data store 235. Additionally, the signal processing engine 230 may use the commute information to determine a current location of a client device 110, and the navigation engine 220 may determine navigation information further using the commute information. The navigation engine 220 and the signal processing engine 230 are further described below in the example described with reference to FIGS. 3-4.

III. Example Broadcasters and Signatures of Short-Range Transmissions

Figure 3:
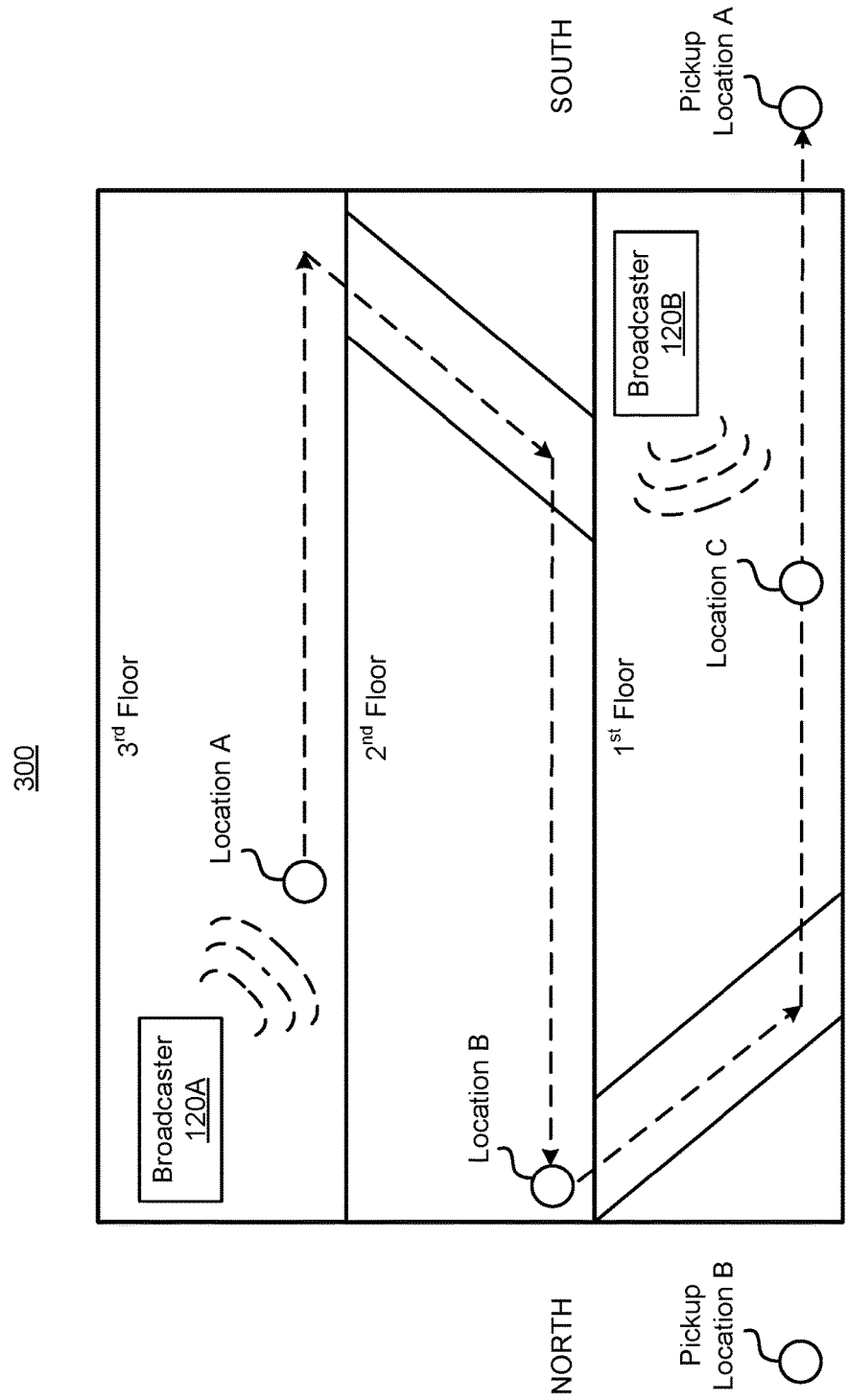
FIG. 3 is a diagram of broadcasters in a building according to one embodiment.
Figure 4:
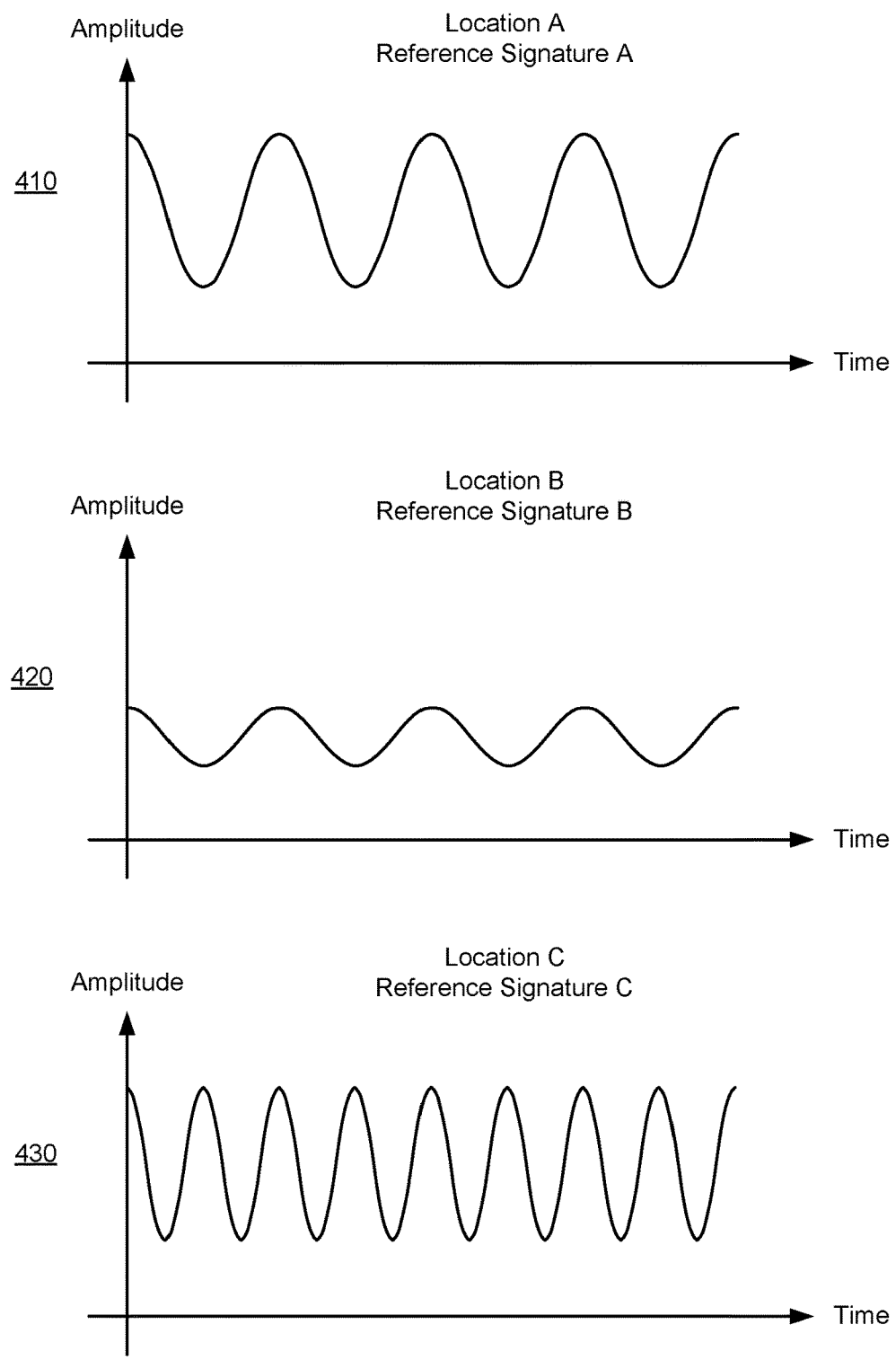
FIG. 4 is a set of diagrams showing signatures of short-range transmissions detected from the broadcasters shown in FIG. 3 according to one embodiment.

FIG. 3 is a diagram of broadcasters in a building 300 according to one embodiment. For example, the building 300 shown in FIG. 3 is a mall (e.g., a multi-floor shopping mall) that includes broadcasters 120 transmitting short-range transmissions. In the embodiment shown in FIG. 3, broadcasters 120A and 120B are Wi-Fi transmitters positioned at the third and first floors of the mall, respectively. The first floor may be a ground floor, e.g., with entrances/exits to a curb or road for pickup by a vehicle. In other embodiments, there may be pickup locations available on a different floor or multiple floors, including underground floors. The map data store 205 of the network system 100 includes reference signatures (e.g., of detected short-range transmissions from broadcasters 120A and 120B) previously collected from various locations within the mall. FIG. 4 is a set of diagrams showing signatures of short-range transmissions detected from the broadcasters 120A and 120B shown in FIG. 3 according to one embodiment.

In an example use case, the network system 100 receives a request for service from a client device 110 of a user at an initially unknown location. Additionally, the navigation engine 220 determines that the user wants to start the service at "pickup location A" on the south side of the mall. The client device 110 detects and provides a first signature of short-range transmission to the network system 100. Graph 410 in FIG. 4 illustrates a "reference signature A" previously detected by another client device at location A. The amplitude, frequency, or other characteristics of the reference signature A may be based on the short-range transmissions emitted by the broadcaster 120A located nearby on the third floor. By performing a lookup in the signature data store 225, the signal processing engine 230 determines that a level of similarity between the first signature and the reference signature A is less than a threshold value. For instance, the signal processing engine 230 compares the amplitude or frequency of the first signature and the reference signature A to determine the level of similarity. Other similarity criterion may be based on, e.g., a detected Wi-Fi network name (SSID), received signal strength indicator (RSSI), Basic Service Set Identifier (BSSID) based on a media access control (MAC) address of an access point, an average frequency of the signatures, or a frequency response of the signatures. In some embodiments, the signal processing engine 230 uses machine learning techniques to refine criterion for determining levels of similarity. Responsive to determining that the level of similarity between the first signature and the reference signature A is less than the threshold value, the navigation engine 220 determines that the client device 110, and the user by extension, is located at location A.

The navigation engine 220 determines a route for the user to travel from location A to the pickup location A. In some embodiments, the navigation engine 220 determines a route having one or more intermediate locations, e.g., to serve as checkpoints to track whether the user is correctly following the provided route. In the example shown in FIG. 3, the dotted arrow lines indicate the route and route directionality. Further, the route includes two intermediate locations, "location B" on the second floor and "location C" on the first floor. When the user is at location A, the navigation engine 220 provides navigation information to the client device 110 to present routing instructions for the user to travel to location B by taking the escalator down from the third floor. The routing instructions may also indicate other information describing location B to assist the user in finding location B, e.g., "walk toward the north side of the mall until you reach the escalators," or "you should pass by a café along the way." As the user travels from location A to location B, the client device 110 may periodically (e.g., once every few seconds or minutes) detect and provide additional signatures to the network system 100. Moreover, the signal processing engine 230 continues to search the signature data store 225 for a match to the additional signatures. Responsive to the signal processing engine 230 determining that a level of similarity between one of the additional signatures and the reference signature B (as illustrated in graph 420 in FIG. 4) is less than a threshold value, the navigation engine 220 determines that the client device 110 and user are located at location B on the second floor.

After the navigation engine 220 determines that the client device 110 is at location B, the navigation engine 220 provides additional navigation information, for the next part of the route, to the client device 110. The client device 110 presents updated routing instructions for the user to travel from location B to pickup location A, e.g., by taking the escalator down to the first floor and walking out of an exit on the south side of the mall. As the user travels from location B, the client device 110 continues to periodically detect and provide signatures to the network system 100. The signal processing engine 230 may determine that another detected signature matches reference signature C (as illustrated in graph 430 in FIG. 4). Responsive to this determination, the navigation engine 220 determines that the user is again correctly following the provided route to pickup location A. Additionally, the navigation engine 220 may provide navigation information to the client device 110 indicating that the user has arrived at the pickup location A, responsive to determining a match with a reference signature associated with pickup location A (not shown in FIG. 4).

In some situations, the user may take a wrong turn or detour from the provided route. For instance, the user became confused as to which side of the mall is south. Consequently, the user instead walks toward pickup location B on the north side of the mall. In this case, the signal processing engine 230 does not determine that any signature detected as the user travels from location B to pickup location B matches reference signature C. After waiting a threshold duration of time (e.g., a timeout) without a match to reference signature C, the navigation engine 220 determines that the user arrived at a deviated location and may provide an indication that the client device 110 has deviated from the provided route. The client device 110 may present the indication to the user as well as routing instructions to return to the correct direction, e.g., "turn back and go to the opposite side of the mall."

In the above example described with respect to FIGS. 3-4, broadcasters 120A and 120B transmit short-range transmissions having different frequencies. Thus, the reference signatures A and B shown in graphs 410 and 420 have a first frequency, while the reference signature C shown in graph 430 has a second frequency, which is greater than the first frequency. Further, the strength of a detected short-range transmission may decrease as a client device 110 is located further from the originating broadcaster 120. Accordingly, the peak-to-peak amplitude of the reference signature shown in graph 420 is less than that of the reference signature shown in graph 410 because location B is further away (and separated by a floor of the building) from broadcaster 120A than is location A, as shown in FIG. 3. Based on these variations in frequency and amplitude, the signal processing engine 230 may determine levels of similarity between detected signatures and reference signatures with sufficient granularity to determine locations of the client device 110 within different floors and sections of the mall.

In some embodiments, the navigation engine 220 and signal processing engine 230 determine navigation information without needing to use GPS data from client devices 110. In other embodiments, the navigation engine 220 and signal processing engine 230 may use both GPS data and signatures of short-range transmission to determine navigation information. For example, the signal processing engine 230 uses a latitude and longitude of a client device 110 determined based on GPS data to verify matches between detected signatures and reference signatures. In particular, the signal processing engine 230 may use the GPS data to determine a confidence score for signature matches, or may adjust a threshold value for comparing a level of similarity between a detected signature and a reference signature.

It should be noted that the graphs shown in FIG. 4 are for illustrative purposes. That is, client devices 110 and the network system 100 do not necessarily graph detected signatures or reference signatures of short-range transmission. Further, the graphs of FIG. 4 show reference signatures each originating from one broadcaster 120, though in practice, client devices may simultaneously detect short-range transmissions from multiple broadcasters 120. Thus, in some embodiments, the detected signature is a superposition of multiple short-range transmissions, each of which may have different parameters (e.g., frequency, amplitude, or SSID). The signal processing engine 230 may filter out noise from detected signatures based on one or more parameters, such as an pre-determined list of target SSIDs of Wi-Fi signals, e.g., based on known information about broadcasters 120 in a venue or building retrieved from the map data store 205.

IV. Example Process Flow

Figure 5:
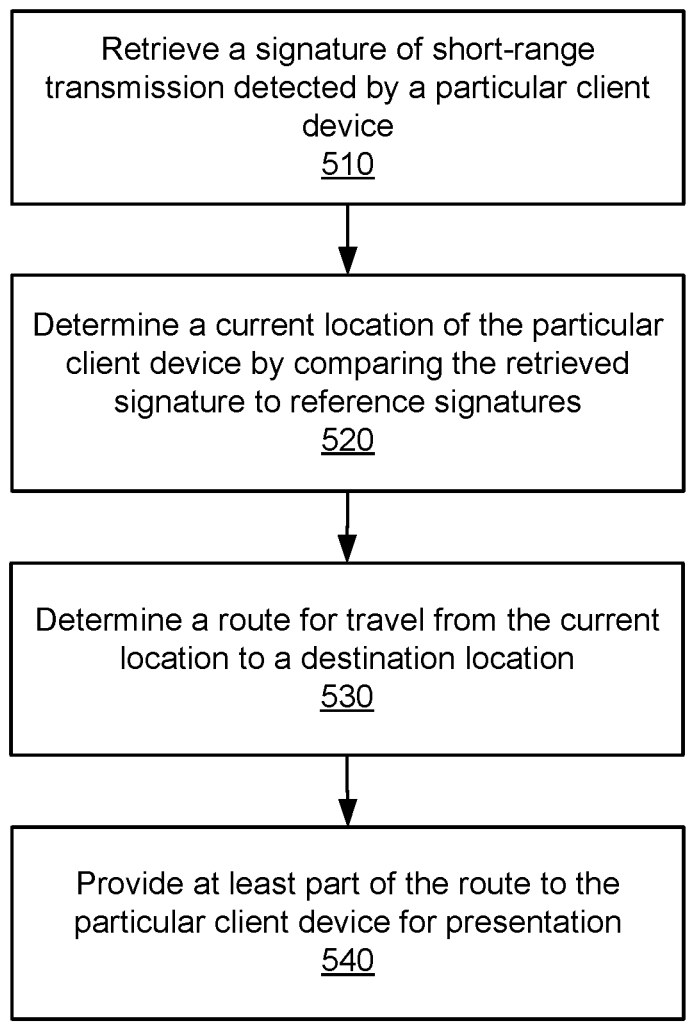
FIG. 5 is a flowchart illustrating a process for determining a route to a pickup location according to one embodiment.

FIG. 5 is a flowchart illustrating a process for determining a route to a pickup location according to one embodiment. In some embodiments, the network system 100 uses the process 500 within the system environment in FIG. 1. The process 500 may include different or additional steps than those described in conjunction with FIG. 5 in some embodiments or perform steps in different orders than the order described in conjunction with FIG. 5.

In one embodiment, the signal processing engine 230 retrieves 510 a signature of short-range transmission detected by a particular client device 110 of a particular user of the network system 100. The signal processing engine 230 determines 520, using one or more processors, a current location of the particular client device 110 by comparing the retrieved signature to reference signatures of short-range transmissions received from client devices of a plurality of users of the network system 100 (stored in the signature data store 225), where each reference signature associated with a location (e.g., a store or floor within a mall building). The navigation engine 220 determines 530, using the one or more processors, a route for travel by the particular user from the current location to a pickup location via an intermediate location for a start of a service provided via the network system 100. At least one of the reference signatures stored in the signature data store 225 is associated with the intermediate location. The navigation engine 220 provides 540 at least part of the route to the particular client device 120 for presentation to the particular user.

In some embodiments, the signal processing engine 230 receives a subsequent signature of short-range transmission detected by the particular client device 110 after providing the at least part of the route to the particular client device 110 for presentation. Responsive to determining that the particular user arrived at the intermediate location by comparing the subsequent signature to the reference signature associated with the intermediate location, the navigation engine 220 may provide an updated part of the route to the particular client device 110 for presentation to the particular user. The signal processing engine 230 may determine that the particular user arrived at the intermediate location responsive to determining that the particular client device 110 is located within threshold distance from the intermediate location based on the comparison.

In some embodiments, the signal processing engine 230 may also analyze signatures of short-range transmission detected by another client device 110 of a provider. In an example use case, the provider is a driver selected by the matching engine 200 to provide transportation service to the user starting at a determined pickup location. Responsive to the signal processing engine 230 determining a match between a signature detected by the provider's client device 110 and a reference signature associated with the pickup location (e.g., pickup location A shown in FIG. 3), the navigation engine 220 may provide navigation information to the providers' client device 110. Based on the navigation information, the client device 110 presents an indication that the driver has arrived at the determined pickup location and should rendezvous shortly with the user to begin the transportation service.

V. Example Physical Components of a Computer

Figure 6:
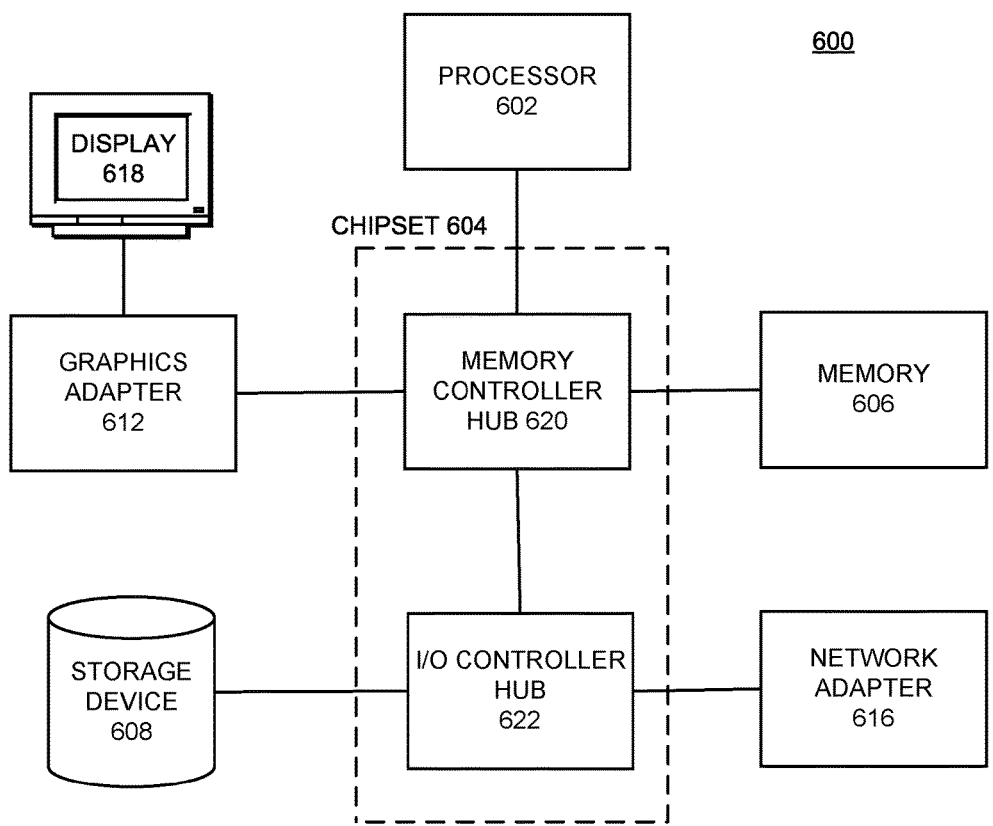
FIG. 6 is a high-level block diagram illustrating physical components of a computer used as part or all of the components from FIG. 1, according to one embodiment.

FIG. 6 is a high-level block diagram illustrating physical components of a computer 600 used as part or all of the components from FIG. 1 (e.g., the network system 100 or client devices 110), according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 such as a server or smartphone may lack a graphics adapter 612, and/or display 618, as well as a keyboard or pointing device. Moreover, the storage device 608 can be local and/or remote from the computer 600, e.g., embodied within a storage area network (SAN).

As is known in the art, the computer 600 is adapted to execute computer program modules or engines for providing functionality described herein. As used herein, the terms "module" or "engine" refer to computer program logic utilized to provide the specified functionality. Thus, a module and/or engine can be implemented in hardware, firmware, and/or software. In one embodiment, program modules and/or engines are stored on the storage device 608, loaded into the memory 606, and executed by the processor 602.

VI. Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for providing routing using short-range transmissions, the method comprising:
   retrieving a signature of short-range transmission detected by a particular client device of a particular user of a network system;
   determining, using one or more processors, a current location of the particular client device by comparing the retrieved signature to reference signatures of short-range transmissions received from client devices of a plurality of users of the network system, each reference signature associated with a location;
   determining, using the one or more processors, a route for travel by the particular user from the current location to a pickup location via an intermediate location for a start of a service provided via the network system, at least one of the reference signatures associated with the intermediate location; and
   providing at least part of the route to the particular client device for presentation.

2. The method of claim 1, further comprising:
   receiving a subsequent signature of short-range transmission detected by the particular client device after providing the at least part of the route to the particular client device for presentation;
   determining that the particular user arrived at the intermediate location by comparing the subsequent signature to the at least one of the reference signatures; and
   providing an updated part of the route to the particular client device for presentation.

3. The method of claim 2, wherein determining that the particular user arrived at the intermediate location comprises determining that the particular client device is located within a threshold distance from the intermediate location based on the comparison.

4. The method of claim 1, further comprising:
   receiving a request for the service from the particular client device;
   receiving another signature of short-range transmission detected by a second client device of a second user of the plurality of users, the second user selected by the network system to provide the service to the particular user in response to receiving the request;
   determining that the second user arrived at the pickup location by comparing the other signature to the at least one of the reference signatures; and
   providing an indication that the second client device has arrived at the pickup location to the second client device for presentation.

5. The method of claim 1, further comprising:
   receiving a subsequent signature of short-range transmission detected by the particular client device after providing the at least part of the route to the particular client device for presentation;
   determining that the particular client device arrived at a deviated location by comparing the subsequent signature to the reference signatures; and
   providing an indication that the particular client device has deviated from the route to the particular client device for presentation.

6. The method of claim 1, wherein determining the current location of the particular client device does not use global positioning system (GPS) data.

7. The method of claim 1, further comprising:
   receiving location data from a sensor of the particular client device; and
   wherein determining the current location of the particular client device further comprises processing the location data.

8. The method of claim 1, further comprising:
   determining a hotspot location of a plurality of candidate hotspot locations as the pickup location, each of the candidate hotspot locations previously selected at least a threshold number of times for services provided via the network system; and
   wherein determining the route for travel by the particular user is based on a plurality of routes previously traveled by a subset of the plurality of users to the hotspot location.

9. The method of claim 1, wherein determining the current location of the particular client device further comprises identifying a floor of a plurality of floors of a building in which the particular client device is located.

10. A method for providing routing using short-range transmissions, the method comprising:
    retrieving a signature of short-range transmission detected by a particular client device of a particular user of a network system;
    determining, using one or more processors, a current location of the particular client device by comparing the retrieved signature to reference signatures of short-range transmissions received from client devices of a plurality of users of the network system;
    providing at least part of a route from the current location to a pickup location via an intermediate location to the particular client device for presentation;
    receiving a subsequent signature of short-range transmission detected by the particular client device after providing the at least part of the route to the particular client device for presentation;

determining that the particular user arrived at the intermediate location by comparing the subsequent signature to the reference signatures; and providing an updated part of the route to the particular client device for presentation.

11. The method of claim 10, wherein determining the current location of the particular client device does not use global positioning system (GPS) data.

12. A computer program product comprising a non-transitory computer readable storage medium having instructions encoded thereon that, when executed by one or more processors, cause the one or more processors to:

retrieve a signature of short-range transmission detected by a particular client device of a particular user of a network system;

determine a current location of the particular client device by comparing the retrieved signature to reference signatures of short-range transmissions received from client devices of a plurality of users of the network system, each reference signature associated with a location;

determine a route for travel by the particular user from the current location to a pickup location via an intermediate location for a start of a service provided via the network system, at least one of the reference signatures associated with the intermediate location; and provide at least part of the route to the particular client device for presentation.

13. The computer program product of claim 12, the non-transitory computer readable storage medium having further instructions that when executed by the one or more processors cause the one or more processors to:

receive a subsequent signature of short-range transmission detected by the particular client device after providing the at least part of the route to the particular client device for presentation;

determine that the particular user arrived at the intermediate location by comparing the subsequent signature to the at least one of the reference signatures; and provide an updated part of the route to the particular client device for presentation.

14. The computer program product of claim 13, wherein determining that the particular user arrived at the intermediate location comprises determining that the particular client device is located within a threshold distance from the intermediate location based on the comparison.

15. The computer program product of claim 12, the non-transitory computer readable storage medium having further instructions that when executed by the one or more processors cause the one or more processors to:

receive a request for the service from the particular client device;

receive another signature of short-range transmission detected by a second client device of a second user of the plurality of users, the second user selected by the network system to provide the service to the particular user in response to receiving the request;

determine that the second user arrived at the pickup location by comparing the other signature to the at least one of the reference signatures; and provide an indication that the second client device has arrived at the pickup location to the second client device for presentation.

16. The computer program product of claim 12, the non-transitory computer readable storage medium having further instructions that when executed by the one or more processors cause the one or more processors to:

receive a subsequent signature of short-range transmission detected by the particular client device after providing the at least part of the route to the particular client device for presentation;

determine that the particular client device arrived at a deviated location by comparing the subsequent signature to the reference signatures; and provide an indication that the particular client device has deviated from the route to the particular client device for presentation.

17. The computer program product of claim 12, wherein determining the current location of the particular client device does not use global positioning system (GPS) data.

18. The computer program product of claim 12, the non-transitory computer readable storage medium having further instructions that when executed by the one or more processors cause the one or more processors to:

receive location data from a sensor of the particular client device; and wherein determining the current location of the particular client device further comprises processing the location data.

19. The computer program product of claim 12, the non-transitory computer readable storage medium having further instructions that when executed by the one or more processors cause the one or more processors to:

determine a hotspot location of a plurality of candidate hotspot locations as the pickup location, each of the candidate hotspot locations previously selected at least a threshold number of times for services provided via the network system; and wherein determining the route for travel by the particular user is based on a plurality of routes previously traveled by a subset of the plurality of users to the hotspot location.

20. The computer program product of claim 12, wherein determining the current location of the particular client device further comprises identifying a floor of a plurality of floors of a building in which the particular client device is located.

* * * * *